US008872625B2

(12) United States Patent
Okeefe et al.

(10) Patent No.: US 8,872,625 B2
(45) Date of Patent: Oct. 28, 2014

(54) BRIDGE BETWEEN SECURITY SYSTEM AND APPLIANCES

(75) Inventors: Mark Douglas Okeefe, San Diego, CA (US); Matt S. Kruger, San Diego, CA (US); Alfred M. Lizza, Oyster Bay, NY (US)

(73) Assignee: Honeywell International Inc., Morristown, NJ (US)

( * ) Notice: Subject to any disclaimer, the term of this patent is extended or adjusted under 35 U.S.C. 154(b) by 456 days.

(21) Appl. No.: 12/950,075

(22) Filed: Nov. 19, 2010

(65) Prior Publication Data

US 2012/0126935 A1 May 24, 2012

(51) Int. Cl.
*H04Q 1/30* (2006.01)
*G08B 25/14* (2006.01)
*G08B 25/00* (2006.01)

(52) U.S. Cl.
CPC .............. *G08B 25/008* (2013.01); *G08B 25/14* (2013.01)
USPC ....... 340/7.36; 340/7.33; 340/5.7; 340/539.1; 307/116

(58) Field of Classification Search
CPC ................. G07C 9/00309; G07C 2009/00793; G07C 9/00103; G07C 9/00182; B60R 25/04; G08B 25/15; G08B 25/008; G08B 5/229; G08B 3/1066; G06F 7/04; G01V 11/002; G01V 1/44; E21B 47/12; E21B 47/16; E21B 47/18; H04W 88/022; H04W 52/0229; H04W 52/0216; H04B 1/1615; H04B 1/40; H03K 17/962; H03K 17/945; H03K 17/955; H03K 17/9645; H05B 39/085
USPC ............. 340/5.2, 5.7, 539.1, 7.32, 7.33, 7.36; 307/116; 236/49.3, 51
See application file for complete search history.

(56) References Cited

U.S. PATENT DOCUMENTS

| | | | | |
|---|---|---|---|---|
| 5,801,625 A | 9/1998 | Wang | | |
| 2004/0075347 A1* | 4/2004 | Biskup et al. | ................. | 307/116 |
| 2004/0172396 A1* | 9/2004 | Vanska et al. | ..................... | 707/9 |

(Continued)

FOREIGN PATENT DOCUMENTS

| | | |
|---|---|---|
| EP | 0 492 427 A2 | 7/1992 |
| EP | 0 492 427 A3 | 7/1992 |
| WO | WO 97/44737 | 11/1997 |

OTHER PUBLICATIONS

European Search Report, dated Mar. 16, 2012, corresponding to Application No. EP 11 19 0024.

*Primary Examiner* — Omer S Khan
(74) *Attorney, Agent, or Firm* — Husch Blackwell LLP

(57) ABSTRACT

A method and apparatus for controlling an appliance. The method includes the steps of a security system within a secured area, said security system having a wireless transmitter transmitting status messages including at least a first encrypted message that the security system in armed and a second encrypted message that the security system is disarmed, an appliance control device having a wireless receiver and a decryption unit, the wireless receiver receiving the first and second encrypted messages, the decryption unit decrypting the first encrypted message to recover the armed status message and decrypting the second encrypted message to recover the disarmed status message and an appliance associated with the secured area and controlled by the appliance control device, the appliance entering a relatively low energy consuming mode in response to the appliance control device receiving the armed message and the appliance entering a relatively high energy consuming mode in response to the appliance control device receiving the disarmed message.

16 Claims, 1 Drawing Sheet

(56) References Cited

U.S. PATENT DOCUMENTS

2005/0270151 A1* 12/2005 Winick .................... 340/539.1
2009/0266904 A1* 10/2009 Cohen .......................... 236/51
2010/0283579 A1* 11/2010 Kraus et al. .................. 340/5.7

* cited by examiner

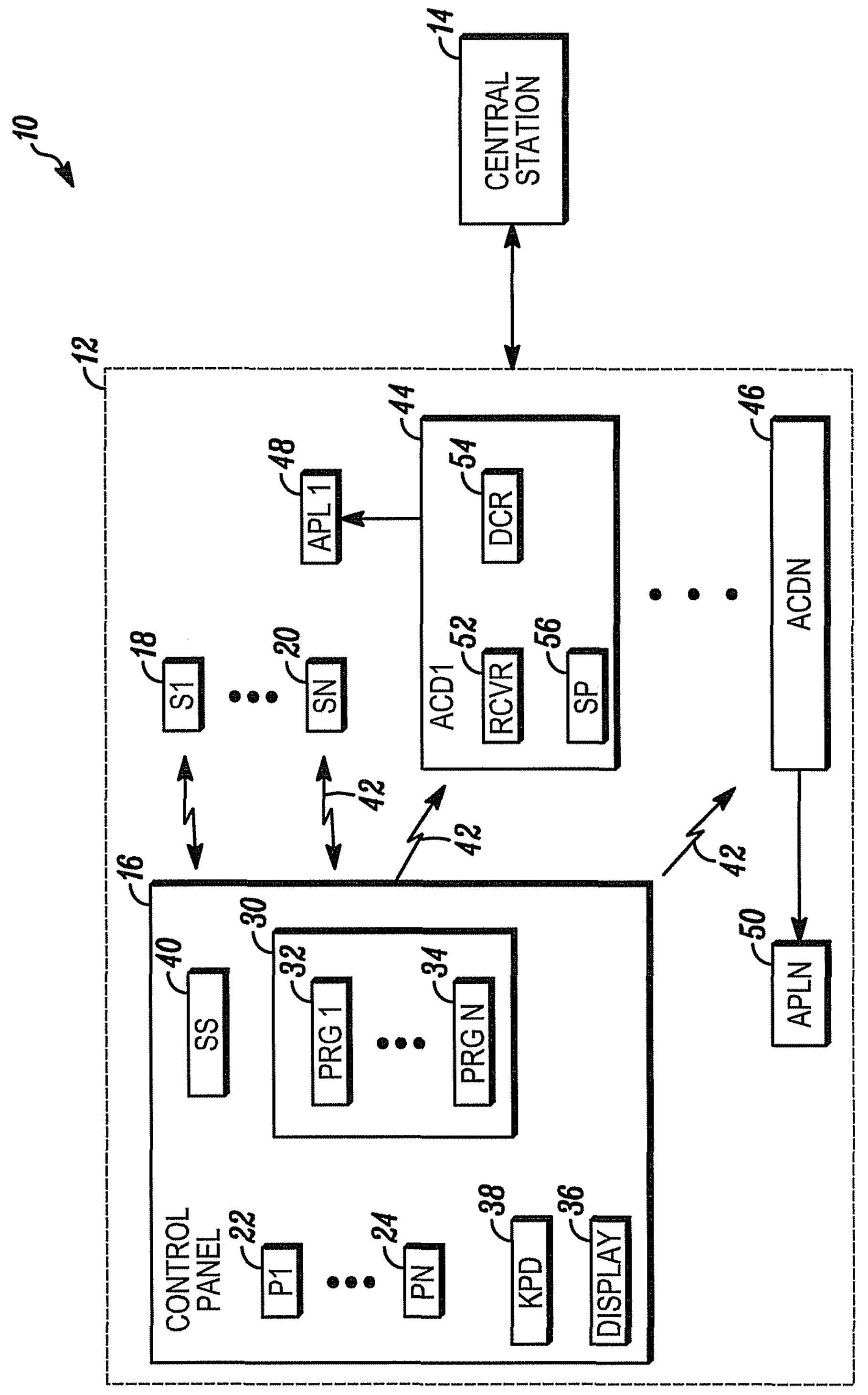
10
14
CENTRAL STATION
12
44
46
48
APL 1
54
DCR
18
S1
20
SN
52
RCVR
56
SP
ACD1
ACDN
42
16
30
40
SS
32
PRG 1
34
PRG N
50
APLN
CONTROL PANEL
22
P1
24
PN
38
KPD
36
DISPLAY

BRIDGE BETWEEN SECURITY SYSTEM AND APPLIANCES

FIELD OF THE INVENTION

The field of the invention relates to security systems and more particularly to wireless security systems.

BACKGROUND OF THE INVENTION

Security systems are generally known. Such systems typically include some form of physical barrier to intruders with one or more sensors to detect intruders who are able to surmount the barrier.

In the case of a home, the physical barrier may be the exterior walls of the home. In this case, the sensors may include door sensors that detect the opening or closing of the doors. Window sensors may also be provided to detect intruders who attempt to enter through a window.

The sensors within a home are typically electrical switches that are mechanically connected to a door or window. In other cases, motion detectors may be used that are based upon infrared detection or the processing of video signals.

In all cases, the sensors are connected to a control panel. The connection may be via wires or via a radio frequency signal.

The control panel typically operates in three modes including disarmed, armed and armed stay. In the disarmed state, the control panel does not report activation of the sensors, while in the armed state the control panel sounds an alarm and may report the alarm to a central monitoring station. In the armed stay used during night time hours, the control panel may only monitor sensors along a periphery of the home.

While security systems are effective, they are typically used in a stand-alone mode because of the need for reliability. However, homes and businesses often have a multiplicity of systems that must be adjusted or controlled based upon occupancy. Accordingly, there is a continuing need to leverage the utility of signals available within a security system for other purposes.

BRIEF DESCRIPTION OF THE DRAWING

FIG. 1 is a block diagram of an appliance control system in accordance with an illustrated embodiment of the invention.

DETAILED DESCRIPTION OF AN ILLUSTRATED EMBODIMENT

FIG. 1 is a block diagram of a security system 10 shown generally in accordance with an illustrated embodiment of the invention. The control panel 16 of the security system 10 is located within a secured area 12. Upon detection of an intruder within the secured area 12, the security system 10 is programmed to compose and send the alarm to a central station monitoring station 14. In such cases, the central monitoring station 14 sends private security personnel or notifies the local police department of the intrusion.

The panel 16 of the security system 10 includes one or more programmed processors 22, 24 operating under control of computer software (i.e., computer code). The computer code includes a number of programs 32, 34 residing in a non-transitory computer readable medium 30.

The security system 10 includes a number of intrusion sensors 18, 20 within or along a periphery of the secured area 12. The sensors 18, 20 may be electrical switches that detect the opening of a door or window or may be motion detectors that detect motion within the secured area 12. The control panel 16 may communicate with the sensors 18, 20 using wires or may communicate wirelessly.

At least one of the programmed processors 22, 24 operates as a status processor that detects entry of a code through a keyboard 38 of the security system 10 and that causes the alarm system 10 to enter a predefined state based upon the entered code. The entered code may include an alarm-away code defining an alarm-away state, a disarm code defining a disarmed state and an alarm-stay code defining an alarm-stay state. The current state of the alarm panel 16 may be indicated by text shown on a display panel 36.

At least one other of the programmed processors 22, 24 (or one of the programs 32, 34 operating on the same processor) operates as an intrusion detection processor based upon the state of the alarm system 10. For example, the intrusion detection processor may monitor all of the sensors 18, 20 when the alarm system 10 is in the alarm-away state and only the perimeter sensors 18, 20 when the alarm system 10 is in the alarm-stay state.

Another one of the programmed processors 22, 24 (or the same processor) operates as an alarm reporting processor. In this case, whenever the intrusion detection processor detects activation of a monitored sensor 18, 20, the intrusion detection processor transfers notification thereof to the alarm reporting processor. The alarm reporting processor composes an alarm packet for transfer to the central monitoring station 14. After an entry delay, the alarm reporting processor transfers the alarm notification to the central monitoring station 14.

Upon assuming an alarm-away or alarm-stay mode, the control panel 16 may wirelessly transmit a status message 42 to the sensors 18, 20. This status message indicates a status of the alarm panel 16 and requests a status of the respective sensors 18, 20. This may be important because it is necessary to know that the area 12 is secure (i.e., the sensors 18, 20 are not in an activated state) when ever the alarm panel 16 enters the alarm-away or alarm-stay mode. If one of the sensors 18, 20 is in an activated state, then a fault message is returned to the user.

Also included within the secured area 12 are one or more appliance control devices 44, 46. The appliance control devices 44, 46 operate to control an operating level of a respective connected appliance 48, 50.

Included within each of the appliance control devices 44, 46 may be a radio frequency (rf) receiver 52, a decryption unit 54 and a status processor 56. The rf receiver 52 may continuously monitor a transmission spectrum of the security system 10 for status messages 42. Any received messages are processed within the decryption unit 54 to decrypt alarm-away, alarm-stay and disarm messages. Any detected alarm-away and disarm messages are sent to the status processor 56.

Upon receiving an alarm-away message, the status processor 56 sends a command to any connected appliance 48, 50 to switch to a relatively low power mode. Upon receiving a disarm message, the status processor 56 sends a command to any connected appliance 48, 50 to switch to a normal mode of operation. Stated another way, the appliance control device 44, 46 has an ON and OFF output, the appliance control device 44, 46 provides one of the ON and OFF outputs upon receiving the armed status message from the security system and the other of the ON and OFF outputs upon receiving the disarmed status message.

The appliances 48, 50 may be any appropriate environmental control device within the secured area 12. For example, the appliance 48, 50 may be an air conditioner used to cool or a heating unit used to heat the area 12. Alternatively, the appliance 48, 50 may be a ceiling fan or motor operate shade or window that obstructs or opens a window to controls the amount of heat or cooling that the space obtains via sunlight or the exchange of inside/outside air.

Moreover, the appliance 48, 50 may be an interface device that causes the environmental control device to operate between a relatively low power consumption mode to a relatively high power mode. An example of such an interface device is a set-back thermostat or active solar heating/cooling system.

In general, the appliance control device operates to detect the status of the alarm system 10 and, in response, to cause the appliance to switch between the relatively low power consumption mode and relatively high power mode. For example, an occupant (e.g., a homeowner) may enter an alarm-away code into his security system 10, when the occupant is about to leave the area 12 for some period of time. Entry of the alarm-away code through the keyboard 38 causes the alarm panel 16 to transmit an encrypted alarm-away message 42 to the sensors 18, 20. The message 42 causes the sensors 18, 20 to respond with an encrypted message indicating their status (e.g., activated, deactivated, etc.).

Under the claimed invention, this encrypted status message is used to control the state of the appliances 48, 50. For example, on a day where the outside temperature is 90 degrees, the receipt of the alarm-away status message 42 may cause the applicant controller 44, 46 to cause the air conditioner to switch from a set point temperature of 75 degrees to 85 degrees or higher resulting in a substantial energy savings.

The appliance control devices 44, 46 may be provided in any of a number of different forms depending upon the format of use. For example, the appliance control device 44, 46 may be incorporated or integrated into the control system of a ceiling fan or light switch. In either case, receipt of an alarm-away message may cause the fan to become deactivated or to transcend to a very low power mode.

Alternatively, the appliance control device 44, 46 may be provided as a separate control module with a set of contacts or with a standardized bus interface (e.g., USB, PCI, etc.) or wireless interface (e.g., Zigbee). In this case, the control module may be connected to an air conditioner control input to cause the air conditioner to transition to the appropriate mode.

A specific embodiment of method and apparatus for controlling appliances in a secured area has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A system comprising:

a security system within a secured area, said security system having a wireless transmitter transmitting wireless status messages including at least a first encrypted message indicating that the security system is armed and a second encrypted message indicating that the security system is disarmed wherein the first encrypted message further comprises an armed status message and the second encrypted message further comprises a disarmed status message;

an appliance control device provided as a separate control module, the appliance control device has a wireless receiver and a decryption unit, the wireless receiver continuously monitors a transmission spectrum of the security system for the wireless status messages, the appliance control device receiving any of the first and second encrypted messages, the decryption unit decrypting the first encrypted message to recover the armed status message and decrypting the second encrypted message to recover the disarmed status message; and an appliance associated with the secured area and controlled by the appliance control device, the appliance entering a relatively low energy consuming mode in response to the appliance control device receiving the armed status message and the appliance entering a relatively high energy consuming mode in response to the appliance control device receiving the disarmed status message, wherein the appliance control device causes the appliance to: enter the relatively low energy consuming mode upon receipt of any transmitted first encrypted message from the security system and recovering the armed status message indicating that the security system is armed, and to enter the relatively high energy consuming mode upon receipt of any transmitted second encrypted message from the security system and recovering the disarmed status message indicating that the security system is disarmed.

2. The system as in claim 1 wherein the appliance further comprises an air conditioning unit.

3. The system as in claim 1 wherein the appliance further comprises a heating unit.

4. The system as in claim 1 wherein the appliance further comprises a set-back thermostat controlling at least one of an air conditioner and a heating unit.

5. The system as in claim 1 wherein the appliance further comprises lighting.

6. The system as in claim 1 wherein the appliance control device further comprises a plurality of appliance control devices each of the plurality of appliance control devices receiving the first and second encrypted messages and each of the plurality of appliance control devices controlling a respective appliance.

7. The system as in claim 6 wherein the respective appliance further comprises a plurality of ceiling fans.

8. A system comprising:

a security system within a secured area that wirelessly transmits a first encrypted status message indicating that the security system is armed and a second encrypted status message indicating that the security system is disarmed wherein the first encrypted status message further comprises an armed status message and the second encrypted status message further comprises a disarmed status message; and an appliance control device provided as a separate control module having a wireless receiver, a decryption unit and providing a first output and a second output, the appliance control device continuously monitors a transmission spectrum of the security system for the wirelessly transmitted first and second encrypted status messages from the security system;

wherein the appliance control device receiving any of the first and second encrypted status messages, the decryption unit decrypting the first encrypted message to recover the armed status message and decrypting the second encrypted message to recover the disarmed status message and provides one or another of the first and second outputs to a controlled appliance based upon receipt of the first and second encrypted status messages, the appliance control device provides one of the first and second outputs upon receiving the armed status message from the security system and the other of the first and second outputs upon receiving the disarmed status message, wherein the appliance control device provides the one of the first and second outputs upon receipt of the transmitted first encrypted status message from the security system indicating that the security system is armed and provides the other of the first and second outputs upon receipt of the transmitted second encrypted status message from the security system indicating that the security system is disarmed;

wherein the appliance control device is controlling an appliance associated with the secured area, the appliance entering a relatively low energy consuming mode in response to the appliance control device receiving the armed status message and the appliance entering a relatively high energy consuming mode in response to the appliance control device receiving the disarmed status message;

wherein the appliance control device causes the appliance to: enter the relatively low energy consuming mode upon receipt of any transmitted first encrypted status message from the security system and recovering the armed status message indicating that the security system is armed, and to enter the relatively high energy consuming mode upon receipt of any transmitted second encrypted status message from the security system and recovering the disarmed status message indicating that the security system is disarmed.

9. The system as in claim 8 wherein the appliance further comprises an air conditioning unit.

10. The system as in claim 8 wherein the appliance further comprises a heating unit.

11. The system as in claim 8 wherein the appliance further comprises a set-back thermostat controlling at least one of an air conditioner and a heating unit.

12. The system as in claim 8 wherein the appliance further comprises lighting.

13. The system as in claim 8 wherein the appliance control device further comprises a plurality of appliance control devices each of the plurality of appliance control devices receiving the first and second status messages and each of the plurality of appliance control devices controlling a respective appliance.

14. The system as in claim 13 wherein the respective appliance further comprises a ceiling fan.

15. A system comprising:

a security system within a secured area that wirelessly transmits wireless status messages including an encrypted first status message indicating that the security system is armed and an encrypted second status message indicating that the security system is disarmed wherein the encrypted first status message further comprises an armed status message and the encrypted second status message further comprises a disarmed status message; and a plurality of appliance control devices, each of the plurality of appliance control devices is provided as a separate control module, has a wireless receiver that continuously monitors a transmission spectrum of the security system for the wireless status messages, has a decryption device that decrypts the encrypted first and second status messages from the security system, has a first output and a second output, and provides one or another of the first and second outputs to a respective appliance in response to the decrypted first and second status messages, wherein each of the plurality of appliance control devices provides the one of the first and second outputs upon receipt of the transmitted encrypted first status message from the security system indicating that the security system is armed and to provides the other of the first and second outputs upon receipt of the transmitted encrypted second status message from the security system indicating that the security system is disarmed;

the respective appliance associated with the secured area and controlled by each of the plurality of the appliance control devices, the respective appliance entering a relatively low energy consuming mode in response to each of the plurality of the appliance control devices receiving the armed status message and the respective appliance entering a relatively high energy consuming mode in response to each of the plurality of the appliance control devices receiving the disarmed status message, wherein each of the plurality of the appliance control devices causes the respective appliance to: enter the relatively low energy consuming mode upon receipt of any transmitted encrypted first status message from the security system and recovering the armed status message indicating that the security system is armed, and to enter the relatively high energy consuming mode upon receipt of any transmitted encrypted second status message from the security system and recovering the disarmed status message indicating that the security system is disarmed.

16. The system as in claim 15 wherein one of the plurality of appliances further comprises an air conditioning unit.

* * * * *